No. 871,214. PATENTED NOV. 19, 1907.
T. A. EDISON.
REVERSIBLE GALVANIC BATTERY.
APPLICATION FILED OCT. 31, 1900.
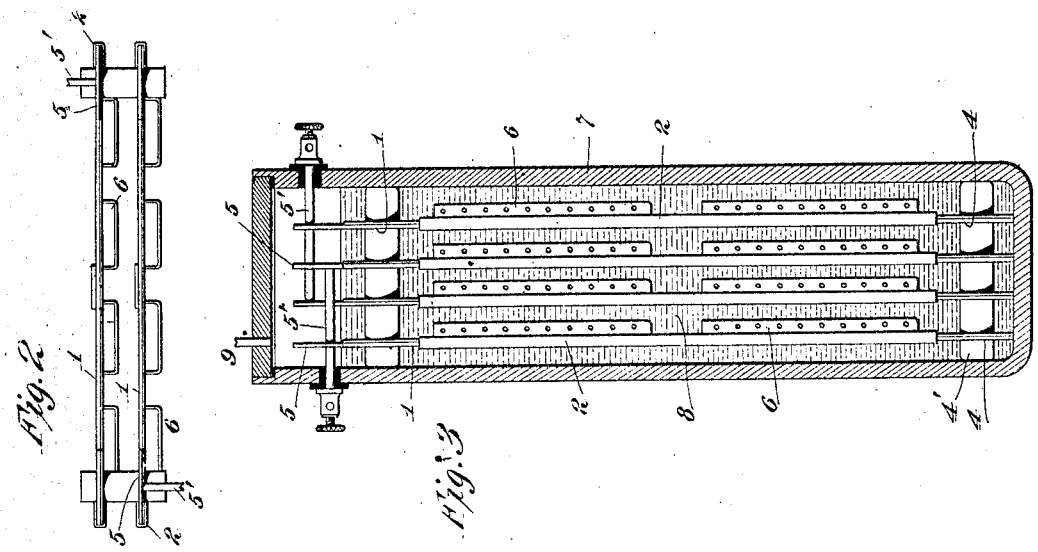
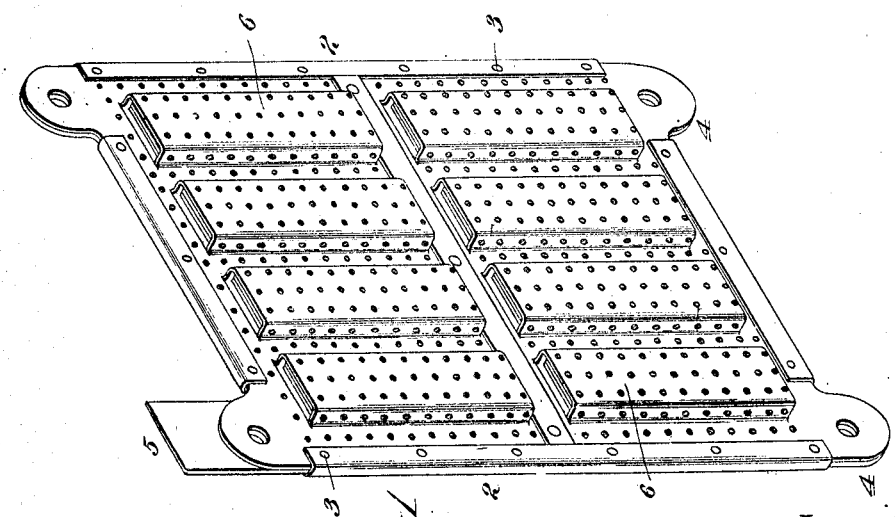
Witnesses: Inventor
Thomas A. Edison
by Dyer Edmonds
Att'ys.

UNITED STATES PATENT OFFICE.

THOMAS A. EDISON, OF LLEWELLYN PARK, NEW JERSEY, ASSIGNOR TO EDISON STORAGE BATTERY COMPANY, OF ORANGE, NEW JERSEY, A CORPORATION OF NEW JERSEY.

REVERSIBLE GALVANIC BATTERY.

No. 871,214.      Specification of Letters Patent.      Patented Nov. 19, 1907.

Application filed October 31, 1900. Serial No. 34,994.

*To all whom it may concern:*

Be it known that I, THOMAS A. EDISON, a citizen of the United States, residing at Llewellyn Park, in the county of Essex and State of New Jersey, have invented a certain new and useful Improvement in Reversible Galvanic Batteries, (Case No. 1,048,) of which the following is a description.

My invention relates to improvements in reversible galvanic cells or so-called storage batteries, and the object of the invention is to provide and produce a battery of this type which is light, portable and durable.

With the commercial storage or reversible galvanic cells as now constructed, the solution is changed as the battery is charged or discharged, thereby requiring a considerable amount of liquid and making the cell heavy and bulky. Thus in the case of the lead storage battery, sulfuric acid is taken from the liquid in the act of discharging. In the case of the zinc and copper oxid battery with alkaline solution, the whole of the zinc is carried in the solution, from which, in the act of charging, it is electroplated upon a suitable electrode. With my improved reversible galvanic cell, nothing is added to or taken from the solution during the charging and discharging since the active materials are insoluble in all conditions of use and in consequence a minimum quantity of solution can be employed, while a high condition of permanence will be secured as I will explain.

My present improvements relate, in the first place, to the use of finely divided metallic cadmium as the active element, and to finely divided copper oxid as the negative element, both being employed in an alkaline solution.

The improvements further relate to the employment of metallic receptacles for retaining the finely divided metals, which receptacles are made of nickel or of some other metal, such as iron, suitably nickelplated.

The improvements further relate to the production of the finely divided cadmium and copper in a proper condition for use in the battery; and, finally, to the construction of the battery as a whole, and to the assembling and treatment of the elements entering into its makeup.

In order that the invention may be better understood, attention is directed to the accompanying drawings forming part of this specification, and in which Figure 1 is a perspective view of one of the plates provided with receptacles for carrying the elements of the battery, Fig. 2 a plan thereof, and Fig. 3 a vertical sectional view showing a cell of four elements properly electrically connected.

In all of the above views corresponding parts are represented by the same numerals of reference.

The plates 1, which are generally rectangular in form and relatively thin, are made preferably of sheet nickel, but sheets of iron or other metal properly nickelplated can be utilized instead. Each plate is provided with a frame 2 surrounding the same, which frame is made also of nickel or of nickelplated metal, and said frame is connected to the plate 1 by nickel rivets 3 which are preferably fused in position by an electric arc operated in the well known manner in order that perfect contact between the frame and plate may be secured. The plates are provided with lugs 4, 4 at their bottoms, by means of which all the plates of the cell may be mechanically connected together by the usual electrically insulated connecting bolts 4', and at their upper ends they are provided with lugs 5, by which the like elements of the cell may be connected electrically in the usual way; for instance, all of the negative plates may be formed with lugs 5 at the right, and the positive plates with these lugs at the left, so that the lugs may be connected together by bolts 5' passing directly through them. Secured to the plates 1 on one side thereof are the nickel or nickelplated pockets or receptacles 6, which are perforated as shown, and which contain the battery elements. The plate as described is the same for the negative element as for the positive element, thereby materially reducing the cost of their manufacture.

In manufacturing my battery, I find that the nickel going into the makeup of the plates and pockets becomes coated with an oxid due presumably to the annealing, and which I find cannot be removed by acids without affecting the plate. I therefore prefer to remove this oxid, in order that the metallic surface of the plate may be absolutely clean, by first heating the plate in a closed chamber until it reaches a red heat, and by then reducing the oxid by hydrogen. Into the pockets 6 of one of the plates of each pair is tightly packed, in the preferred instance, finely divided metallic cadmium as the positive element, and into the receptacles of the other plate of the pair is packed, in the preferred instance, finely divided copper oxid as the negative element.

The finely divided metallic cadmium is preferably obtained by an electrodeposition process, a very thin platinum wire being used as the cathode, a plate of metallic cadmium as the anode, and a weak solution of sulfate of cadmium as the electrolyte. By employing a strong current in the electrolyte with a small platinum wire as the cathode as explained, the cadmium will be deposited thereon in its metallic state, exceedingly finely divided and filamentary in form and of great purity. The deposited finely divided cadmium is detached from time to time from the cathode, and is washed in water to remove any adhering sulfate of cadmium, after which it is packed in the perforated pockets 6 of the desired plates, which are then ready for use in the cells.

By reason of the filamentary character of metallic cadmium, the packed mass within the perforated pockets can be made very coherent, while at the same time sufficient porosity will be secured to permit the electrolyte to effectively circulate through the same.

In the case of the preparation of the finely divided copper oxid, greater preparations are necessary in order that proper results may be secured. In all the attempts of previous experimenters to use copper oxid as a depolarizer in reversible batteries, the phenomenon was observed of the production of a small amount of a copper salt, bluish in color, and which was soluble in the alkaline liquid. With the previous experiments it was observed that this soluble salt in circulating in the solution was reduced to the metallic state by contact with the active metal (zinc for instance), producing local action and resulting in the rapid deterioration of the elements. The previous experimenters attempted to prevent the circulation of the soluble copper salt in the liquid by surrounding the copper element with a porous material, which while not preventing the current-flow, would to a certain extent retard the circulation of the soluble copper salt. The experiments referred to were, however, unsuccessful, for the reason that the porous material would not permanently prevent the circulation of the soluble salt, and the peculiar porous materials which had to be used were themselves destroyed in time by the strong alkaline liquid necessarily employed for holding in solution a sufficient quantity of the active material. Such experiments were also unsuccessful because a relatively large bulk of liquid was necessary, while the resistance of the cell was enormously increased. In consequence, reversible batteries using copper oxid as a depolarizer have never remained in commercial use and are now obsolete. I have ascertained the cause of the production of the soluble copper salt referred to, and have prevented its formation entirely so as to overcome the objections which were met in practice by the early experimenters with cells of this type. Briefly stated, my discovery resides in the fact that when the copper is in very finely divided form, the production of the soluble salt is entirely overcome, since the effect of the current is to make anhydrous and insoluble in the alkaline liquid any copper oxid which may be formed. If, on the other hand, there is a single piece, however minute, of dense copper, or even if the finely divided copper is compressed sufficiently to materially increase its density, a soluble hydroxid of copper will be formed therefrom with the objections indicated. Furthermore, I find that copper scale cannot be employed with safety on account of its density after reduction to the metallic state, and also because it generally contains some unoxidized copper, from which on reoxidation by the current the blue hydroxid referred to will inevitably be produced. In practice therefore, I preferably obtain the finely divided copper by reducing pure carbonate of copper in the usual way by hydrogen at the lowest possible temperature that will insure perfect reduction. A material increase in the temperature has been found to result in an objectionable increase in the density of the copper produced. When the copper has been thus secured in finely divided form, it is molded into thin blocks of the proper shape to fit snugly in the pockets 6 of the plates. The pressure used in molding these plates should not be greater than is necessary to permit the plates to be easily handled without breakage, and care especially should be taken that the molding devices do not scratch or indent the plates to thereby locally increase the density of the copper and thereby result in the objectionable formation of the blue hydroxid referred to. After the copper plates have been molded, they are subjected in a closed chamber to a temperature of not over five hundred degrees Fahrenheit for six or seven hours until the copper is converted into its black oxid ($CuO$). If higher temperatures are employed, the density of the black oxid will be undesirably increased. After being thus oxidized, the copper oxid blocks are reduced electrolytically to metallic copper, and are then reoxidized on charging by the current until they are converted into the red oxid ($Cu_2O$). In this form, the blocks are inserted in the perforated pockets 6 of the desired plates, which are then ready for use.

The finely divided copper originally obtained by reduction by hydrogen as explained, may be lightly packed in the perforated receptacles without being first oxidized by heat as described. I find, however, that when this is done, the efficiency is not so high as when the copper is first oxidized to the black oxid, because, unlike the cadmium, it is not filamentary in form, and its particles as originally produced do not apparently effect an intimate electrical contact with each other. Finely divided copper obtained as described or in any other way, and of such a character as to prevent, when oxidized, the formation of a soluble copper salt in an alkaline solution, is not necessarily limited in its use in connection with a reversible galvanic cell employing cadmium as the active element, but on the contrary it may be employed to advantage as a depolarizer in other alkaline solution cells wherein zinc, for example, is used as the active element.

The copper oxid and cadmium plates obtained as I have explained, are then properly connected through the lugs 4, 4, which are suitably insulated from each other, and by the lugs 5, so that the like plates of the cell will be electrically connected. The plates, after they have been thus aggregated, are inserted in a suitable jar 7, containing preferably about a ten per cent solution 8 of pure sodic hydroxid.

In operation, when the battery is discharged, the copper oxid is reduced to the metallic state, while the metallic cadmium is oxidized to cadmous oxid ($Cd_2O$). Upon recharging, the oxid of cadmium is reduced to the metallic state, while the copper is oxidized to copper oxid ($Cu_2O$). In the charging and discharging of the cell, water from the liquid is respectively decomposed and regenerated, leaving the liquid in exactly the same condition and quantity after each discharge. For this reason the amount of liquid used may be very small, and in fact I find in practice that by interposing between the plates thin sheets of asbestos, or of any suitable light, powdered material not attacked by the alkali such as oxid of magnesium and which have been merely moistened with the alkaline liquid, nearly as good results can be secured as when the plates are actually immersed in the solution. In this way I am enabled to produce a reversible galvanic cell which is in fact a so-called dry battery.

The voltage of my improved battery is .44 volts. Its internal resistance is extraordinarily small, and the output per pound of cell exceeds that of any combination of which I have any knowledge. Furthermore, exhaustive tests which have been made, have demonstrated that there is practically no deterioration, since neither nickel, nor cadmium nor any of their oxids, nor copper, nor its anhydrous lower oxids, are soluble in the alkaline liquid, while there is no local action between the metallic cadmium and nickel, on account of the position of the two metals in the electric series. The jar or cell 7 for containing the elements may be made of nickel or iron or other metal nickel-plated on its interior and hermetically sealed as to the liquid, a gas vent 9 being alone necessary to permit the escape of gases which may be generated in case the battery is overcharged.

Having now described my invention, what I claim as new and desire to secure by Letters Patent is as follows:

1. In a reversible galvanic cell, an alkaline solution; an electrode consisting of an insoluble metallic perforated inclosing pocket, and a finely divided insoluble active material tightly packed in such inclosing pocket; and a second electrode, substantially as set forth.

2. In a reversible galvanic cell, an alkaline solution; and an electrode therein comprising an insoluble electrode plate, a series of insoluble metallic perforated inclosing pockets carried by said plate, and an insoluble active material tightly packed in said pockets; and a second electrode, substantially as set forth.

3. A reversible galvanic cell, comprising an alkaline solution, a positive element composed of finely divided cadmium in filamentary form and a suitable negative electrode, substantially as set forth.

4. A reversible galvanic cell, comprising an alkaline solution, and an electrode consisting of a nickel plate, a perforated receptacle thereon, finely divided cadmium in said receptacle, and a second electrode, substantially as set forth.

This specification signed and witnessed this 15th day of October 1900.

THOMAS A. EDISON.

Witnesses:
J. F. RANDOLPH,
J. A. BOEHME.